(12) United States Patent
Sinha et al.

(10) Patent No.: US 8,837,811 B2
(45) Date of Patent: Sep. 16, 2014

(54) MULTI-STAGE LINEAR STRUCTURE FROM MOTION

(75) Inventors: Sudipta Narayan Sinha, Redmond, WA (US); Drew Edward Steedly, Redmond, WA (US); Richard S. Szeliski, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 947 days.

(21) Appl. No.: 12/817,216

(22) Filed: Jun. 17, 2010

(65) Prior Publication Data

US 2011/0311104 A1 Dec. 22, 2011

(51) Int. Cl.
*G06K 9/00* (2006.01)
*G06T 7/00* (2006.01)

(52) U.S. Cl.
CPC ............ *G06T 7/0042* (2013.01); *G06T 7/0071* (2013.01); *G06T 2207/10016* (2013.01)
USPC ........... 382/154; 382/224; 382/225; 382/190; 382/103; 382/100

(58) Field of Classification Search
CPC .................. G06T 7/0075; G06T 2207/10012; G06T 2207/10016; G06K 9/00664; G06K 9/6218
USPC .......... 382/224, 225, 154, 190, 195, 103, 100
See application file for complete search history.

(56) References Cited

U.S. PATENT DOCUMENTS

| | | | |
|---|---|---|---|
| 6,307,959 B1 | 10/2001 | Mandelbaum et al. | |
| 7,352,386 B1 | 4/2008 | Shum et al. | |
| 7,359,526 B2 * | 4/2008 | Nister | 382/100 |
| 7,616,807 B2 | 11/2009 | Zhang et al. | |
| 2003/0044048 A1 | 3/2003 | Zhang et al. | |
| 2009/0244062 A1 | 10/2009 | Steedly et al. | |
| 2009/0296984 A1 | 12/2009 | Nijim et al. | |

OTHER PUBLICATIONS

Thormahlen et al: "Keyframe selection for camera motion and structure estimation from multiple views", ECCV, SVBH, 2004.*
Clipp et al: "Robust 6DOF motion estimation for non-overlapping multi-camera systems", IEEE, 2008.*
Civera, et al., "1-Point Ransac for EKF-Based Structure from Motion", Retrieved at << http://www.doc.ic.ac.uk/~ajd/Publications/civera_etal_iros2009.pdf >>, IEEE/RSJ International Conference on Intelligent Robots and Systems (IROS), 2009, pp. 7.
"Structure from motion", Retrieved at << http://mi.eng.cam.ac.uk/~cipolla/publications/contributionToEditedBook/2008-SFM-chapters.pdf >>, pp. 1-49.
Bosse, et al., "Vanishing Points and 3D Lines from omnidirectional video", Retrieved at << http://cml.mit.edu/~jleonard/pubs/tvc_final.pdf >>, In International Conference on Image Processing, ICIP02, 2002, pp. 1-10.

(Continued)

*Primary Examiner* — Ruiping Li
(74) *Attorney, Agent, or Firm* — Steve Wight; Sandy Swain; Micky Minhas

(57) ABSTRACT

Described is a linear structure from motion technique that is scalable, parallelizable, treats images equally, and is robust to outliers, without requiring intermediate bundle adjustment. Camera rotations for images are estimated using feature point correspondence and vanishing points matched across the images. The camera rotation data is fed into a linear system for structure and translation estimation that removes outliers and provides output data corresponding to structure from motion parameters. The data may be used in further optimization e.g. with a final non-linear optimization stage referred to as bundle adjustment to provide final refined structure from motion parameters.

20 Claims, 3 Drawing Sheets

(56) References Cited

OTHER PUBLICATIONS

Antone, et al., "Scalable Extrinsic Calibration of Omnidirectional Image Networks", Retrieved at << http://citeseerx.ist.psu.edu/viewdoc/download?doi=10.1.1.90.9269&rep=rep1&type=pdf >>, International Journal of Computer Vision, vol. 49, No. 2-3, Sep.-Oct. 2002, pp. 33.

Rother, Carsten., "Linear Multi-View Reconstruction of Points, Lines, Planes and Cameras using a Reference Plane", Retrieved at << http://lear.inrialpes.fr/people/triggs/events/iccv03/cdrom/iccv03/1210_rother.pdf >>, ICCV, Proceedings of the Ninth IEEE International Conference on Computer Vision, vol. 2, Oct. 13-16, 2003, pp. 8.

Rother, et al., "Linear Multi View Reconstruction and Camera Recovery", Retrieved at << http://www.nada.kth.se/~carstenr/papers/paper_iccv01.pdf >>, Eighth International Conference on Computer Vision (ICCV'01), vol. 1, Jul. 7-14, 2001, pp. 8.

Kahl, et al., "Multiple-View Geometry under the L Norm", Retrieved at << http://ieeexplore.ieee.org/stamp/stamp.jsp?tp=&arnumber=4385722 >>, IEEE Transactions on Pattern Analysis and Machine Intelligence, vol. 30, No. 9, Sep. 2008, pp. 1603-1617.

Martinec, et al., "Robust Rotation and Translation Estimation in Multiview Reconstruction", Retrieved at << http://citeseerx.ist.psu.edu/viewdoc/download?doi=10.1.1.88.2067&rep=rep1&type=pdf. >>, IEEE Conference on Computer Vision and Pattern Recognition, Jun. 17-22, 2007, pp. 10.

Winder, et al., "Picking the Best DAISY", Retrieved at << http://research.microsoft.com/pubs/79807/winder_hua_brown_cvpr09.pdf >>, IEEE Conference on Computer Vision and Pattern Recognition, Jun. 20-25, 2009, pp. 8.

Lowe, David G., "Distinctive Image Features from Scale-Invariant Keypoints", Retrieved at << http://www.cs.ubc.ca/~lowe/papers/ijcv04.pdf >>, Jan. 5, 2004, pp. 1-28.

Sim, et al., "Removing Outliers using the Linfty norm, Retrieved at <<http://ieeexplore.ieee.org/stamp/stamp.jsp?tp=&arnumber=1640796", Jun. 17-22, 2006, p. 485-494.

\* cited by examiner

MULTI-STAGE LINEAR STRUCTURE FROM MOTION

BACKGROUND

In computer vision, a collection of images may be processed to simultaneously recover camera pose and structure of the scene, such as to recover three-dimensional (3D) information about the scene for various applications. The problem of estimating scene structure (3D geometry) and camera motion (camera pose) from multiple images of a scene is referred to as structure from motion (Sfm).

Most vision-based structure from motion systems are sequential, starting with a small reconstruction of a scene with two cameras, then incrementally adding in new cameras one at a time by pose estimation, and 3D points by triangulation. This is followed by multiple rounds of intermediate bundle adjustment (robust non-linear minimization of the measurement/re-projection errors), and removal of outliers (erroneous measurements) to minimize error propagation as the reconstruction grows.

The sequential approach to structure from motion is computationally expensive for large image collections. The sequential approach also can suffer from the problem of accumulation of drift as errors compound. This makes a reconstructed scene appear incorrect, e.g., what is actually a square corner appears to be somewhat rounded and at something other than ninety degrees. What is desirable is computing a direct initialization (estimates for camera poses and structure) in an efficient and robust manner, without any intermediate bundle adjustment, (allowing for a final bundle adjustment for the complete structure and all the cameras).

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a plurality of scene images are processed with a linear structure from motion pipeline/process comprising two stages, including a camera rotation estimation stage and a subsequent linear estimation stage for recovering camera translation and 3D points observed in the cameras. Camera rotation data for a plurality of cameras corresponding to the scene images are obtained, and pairs of cameras are selected based upon the observed 2D point correspondences. For each pair of images where geometrically verified 2d point correspondences are available (i.e., a reliable estimate of the epipolar geometry is available), the translation direction is determined and a set of 3D points are determined by triangulating the 2D observations in the two images. The determining of the translation direction for one or more pairs may be performed (at least in part) in parallel.

Pairs of pairs are selected, and for each of the pairs of the pairs, a relative geometric transformation is determined that brings the pairs of pairs into a common coordinate system. This enables detecting which 3D points are geometrically consistent in three images; the remaining points are classified as outliers. The outliers are removed, and 2D observation data corresponding to the three-view consistent three-dimensional points are processed in the linear system to estimate the unknown structure from motion parameters. The data may be used to further optimize the structure from motion parameters.

In one aspect, the camera rotation parameters are computed. A feature extraction mechanism extracts interest points and line segments from images of a scene; pairwise relations between cameras are computed based upon the interest points. A vanishing point estimation mechanism estimates vanishing points from the line segments, and a line segment and vanishing point matching mechanism processes the pairwise relations and the vanishing points to compute point and line track data that in turn is used to compute global rotation data.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards a structure from motion process generally comprising two phases, including a first phase that recovers rotations, and a second phase that estimates unknown parameters, e.g., camera positions/translations/optical parameters (such as focal lengths, an approximate value of which can be easily obtained from modern cameras) and the 3D positions of the points that have been measured. The technology uses points and vanishing points in the scene, and is well suited for man-made environments. As will be readily appreciated, unlike sequential structure from motion techniques, the technology described herein treats images equally, is easy to parallelize and does not require intermediate bundle adjustments, and is therefore faster. Low drift is present in the reconstruction, and a good initialization for a final bundle adjustment on a variety of scenes can be computed.

It should be understood that any of the examples and descriptions herein are non-limiting. For example, while man-made scene processing is described because of the numerous benefits and advantages with man-made scenes, other scenes may be used. As another example, there are other ways to determine camera rotation, including in non-man-made scenes, and thus the second phase which needs knowledge about camera rotation data is not limited to any particular way to obtain the camera rotation data. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used in various ways that provide benefits and advantages in computing and scene processing in general.

Figure 1:
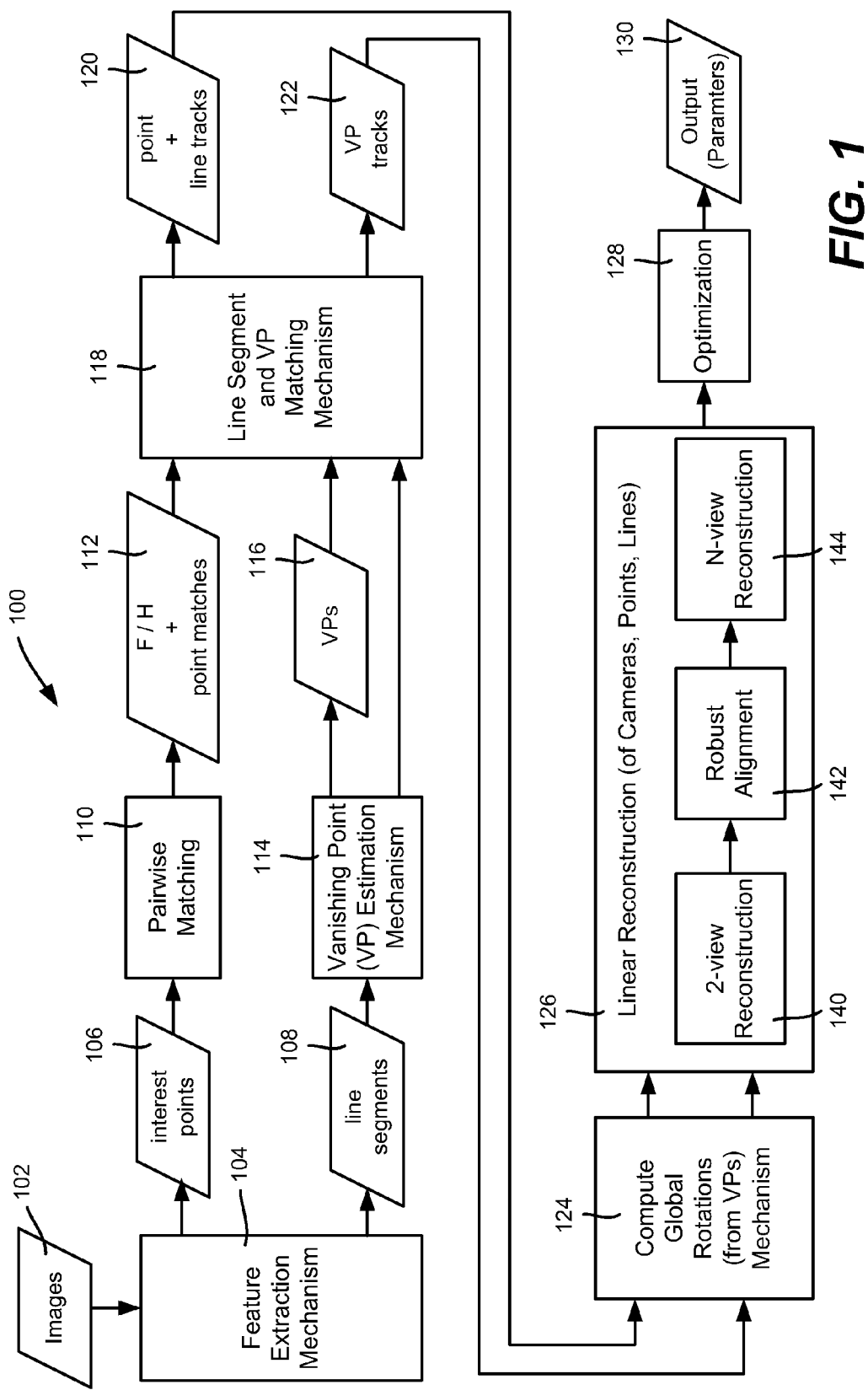
FIG. 1 is a representation of a multi-stage structure from motion pipeline in which camera rotations are computed first and then the remaining parameters, namely camera translations as well as 3D points are estimated by a linear system to provide output data corresponding to structure from motion parameters.

FIG. 1 is a block/data flow diagram showing one implementation of a structure from motion pipeline 100. In one implementation, camera rotations are first computed as described below, using an approach that uses vanishing points extracted and matched in multiple images, as well as pairwise rotation estimates obtained from point matches. A linear technique is then used to simultaneously estimate the camera translations and 3D points. Pairwise reconstructions are performed, followed by robustly aligning the reconstructions in pairs, and aligning them globally by estimating their unknown scales and translations. In the processing, outliers are detected and removed, and approximate depth estimates become available, after which the cameras and points can be linearly estimated from outlier-free observations.

More particularly, using known technology, given a set of images 102, a feature extraction mechanism 104 extracts interest points (feature points) 106 and line segments 108 in a known manner. After extracting point features, a pairwise matching 110 (e.g., using known kd-tree based pairwise matching) may be performed to obtain an initial set of two-view interest point matches. These matches, based on photometric similarity, are then filtered through a standard RANSAC-based (random sample consensus-based) geometric verification step, which robustly computes pairwise relations between cameras. The relations correspond to a fundamental matrix F, or a homography H in the case of pure rotation or dominant planes, (as represented in block 112 as F/H+point matches in FIG. 1).

As also represented in FIG. 1, the straight line segments 108 in the images are recovered, using edge detection followed by connected component analysis on the edgels. A local segment growing stage, with successive rounds of RANSAC, computes connected sets of collinear edgels. Orthogonal regression is used to fit straight line segments to these collinear edgels. Quantized, color-histogram-based two-sided descriptors are computed for each segment, to be used later for appearance-based matching.

Estimation of the vanishing points (blocks 114 and 116 in FIG. 1) in each image again uses RANSAC, this time to repeatedly search for subsets of concurrent line segments. Once a vanishing point has been detected along with a set of supporting lines, the process is repeated on the outlier set. Because intrinsics are known, vanishing point hypotheses that are within an angle of some number of (e.g., five) degrees of existing vanishing point estimates in the image may be rejected.

In each image, a process heuristically determines which vanishing point (if any) corresponds to the vertical direction in the scene, by assuming that a majority of the images were captured upright (with negligible camera roll). The 2D line segments are labeled with the vanishing points they support. Note that while the repeated use of RANSAC is known to be a sub-optimal strategy for finding multiple structures, it is almost always able to accurately find the dominant vanishing points in the image.

Vanishing points are matched (block 118) in multiple image pairs, such as represented in a pruned match graph $G_m$, comprising nodes for each image and edges between images with good matches, for which a pairwise rotation estimate can be computed. The process allows for some errors in this estimate, and retains multiple vanishing point match hypotheses that are plausible under this rotation, up to a conservative threshold. These hypotheses are verified by subsequently matching line segments, and accepting a vanishing point match that unambiguously supports enough segment matches.

Line segments are matched (blocks 118 and 120) using appearance as well as guided matching (in which correct line matches typically have interest point matches nearby). Note that vanishing point matching has an ambiguity in polarity, as the true vanishing point can be confused with its antipode, especially when they are close to infinity in the image. The orientation of line segments, matched using two-sided descriptors, is used to resolve this ambiguity.

Vanishing point matches are linked into multi-view tracks 122 by finding connected components, in the same way as is done for point matches. Note however that the polarity of the observed vanishing points is remembered. Note that vanishing point tracks 122 are often disconnected, however different tracks that correspond to the same 3D direction may subsequently be merged, as described herein.

As represented by block 124, camera rotations are estimated, primarily using vanishing points, augmented with relative rotation estimates obtained from point matches, where necessary. As described below, cameras and 3D points are then directly estimated using a linear reconstruction mechanism 126 that handles outliers and initializes an optimization 128 (e.g., a final bundle adjustment) to provide the output 130, e.g., the final parameters.

With respect to computing rotations (block 124), in general, given three orthogonal scene directions, the global camera rotation in a coordinate system aligned with them is computable from the vanishing points corresponding to these directions. Each column of the rotation matrix can be computed from one of the vanishing points. Note that two vanishing points are sufficient, because the third column may be computed from the other two. However, this rotation estimation method assumes that the directions are known; the technology described herein handles unknown directions.

More particularly, described herein is a process for recovering camera rotations given a finite number of vanishing point tracks, each of which corresponds to an unknown 3D direction. As some of the vanishing points can be labeled as vertical in the images, it is known which tracks to associate with the up direction in the scene. Pairwise angles between the directions are computed via measurements, in which any image where at least two vanishing points were detected contributes to a measurement.

The directions are ranked with decreasing weights, where each weight is computed by counting the number of supporting line segments over the images where a corresponding vanishing point was detected. Next, the most salient orthogonal triplet of directions is found, such that at least one track corresponding to the up direction is included. For all images, where at least two of these directions are observed, camera rotations are computed.

If some of the remaining directions were observed in any one of these cameras, those directions can be computed at this point. The process is repeated until no more cameras or directions can be added. This produces a first camera set, namely a subset of cameras with known rotations, consistent with a set of 3D directions. The process is repeated, providing a partition of the input cameras into mutually exclusive camera sets, some of which may potentially share a common direction (typically this is the up direction). A camera that sees fewer than two vanishing points generates a set with a single element.

If only a single camera set is found, the computation process is complete. Otherwise, each of the camera sets need to be rotationally aligned to obtain the global camera rotations (block 124). A unique solution is obtained by fixing the rotation of one of the camera sets to identity. Note that an estimate of the relative rotation between camera pairs in the match graph is known (from the essential matrix, when cameras have a non-zero baseline). This rotation involving the i-th and j-th cameras, chosen from camera sets a and b respectively, by the quaternion $q_{ij}$. Each estimate of $q_{ij}$ provides a non-linear constraint relating the unknown rotations of the two camera sets denoted by $q^a$ and $q^b$ respectively.

By ignoring the orthonormality constraints on the unknown quaternions, the set of quaternions may be linearly estimated. By assuming that scene directions consist of a unique vertical direction and multiple directions in the horizontal plane, not all of which are mutually orthogonal, the unknown quaternion may be constrained to be a rotation in the horizontal plane. Such a 1-degree of freedom parameterization can be chosen for each camera set where the vertical VPs have been detected. Once the rotations have been estimated, scene directions within some number of (e.g., five) degrees of each other are merged, and the rotations re-estimated from the constrained 3D directions. This is useful in scenarios such as identifying parallel lines on opposite sides of a building, even when they are never seen together. Knowing rotations and principal scene directions makes it easier to identify points and lines on dominant planes (which are often orthogonal to pairs of principal directions), such as to include coplanarity constraints in the subsequent reconstruction step.

Turning to linear reconstruction in general, once the cameras are known, instead of solving for all cameras directly, pairs of cameras are selected and independently processed to determine the translation between them to obtain their relative position data. With the relative position data, pairs of pairs are then processed to determine the relative geometric transformation that brings these pairs of pairs and common 3D points into the same coordinate system. Note that because the rotations are known, this geometric transformation involves only four unknown parameters, namely relative scale and translation vector. Further note that processing independent pairs and/or pairs of pairs facilitates parallelization, as well as treating all cameras equally (rather than serially adding cameras one-by-one).

As will be understood, during the processing the outliers become known, along with the approximate depths of the points in the scene. Outliers are removed, and the approximate depths plugged into a linear system of equations that solves to a good approximation the unknown parameters. Subsequently, a global non-linear optimization (e.g., a known technique such as bundle adjustment) may be used to get the final parameters.

More particularly, when the intrinsics $K_i$ and rotations $R_i$ are known, every 2D image point $x_{ij}$ can be normalized into a unit vector, $\hat{x}_{ij} = (K_i R_i)^{-1} X_{ij}$ which is related to the j-th 3D point $X_j$ (in non-homogenous coordinates) as, $$\hat{x}_{ij} = d_{ij}^{-1}(X_j - C_i), \quad (1)$$

where $d_{ij}$ is the distance from $X_j$ to the camera center $C_i$. Note that equation (1) is written with $d_{ij}$ on the right side, to ensure that measurements are weighted by inverse depth. Hereinafter, $\hat{x}_{ij}$ is simply denoted as $x_{ij}$. By substituting approximate values of the distance (or depth), if known, equation (1) can be treated as a linear equation in $X_j$ and $C_j$. The measurements together form a sparse, non-homogeneous, linear system, which can be solved to estimate the cameras and points all at once. These can be further refined by iteratively updating $d_{ij}$ and solving equation (1).

An alternative approach is to eliminate $d_{ij}$ from equation (1) since $$d_{ij} x_{ij} \times (X_j - C_i) = 0.$$

The cameras and points can be directly computed by solving a sparse, homogeneous system, using SVD (or a sparse eigensolver), and fixing one of the cameras at the origin to remove the translational ambiguity. The points at infinity first need to be detected and removed. Because it minimizes a purely algebraic cost function, if the linear equations are not weighted correctly, points farther away from the camera may bias the linear system, resulting in large reconstruction error.

Neither of these linear methods can handle outliers in the feature tracks, which is inevitable in automatic structure from motion systems. As described herein, instead of directly solving equation (1) for all cameras and points at once, the mechanism independently computes two-view reconstructions (block 140) for camera pairs that share one or more points in common. Various approaches for computing such two-view reconstructions are known, and the situation is more straightforward for a pair of cameras differing by a pure translation.

Next, pairs of such reconstructions, sharing a camera and 3D points in common, are robustly aligned (block 142) by estimating their relative scale and translation. This allows retaining matches found to be consistent in the three views.

Once a sufficient number of two-view reconstructions have been aligned pairwise, the unknown scale and translation of each of these individual reconstructions are linearly estimated, which roughly brings them into global alignment. An approximate estimate of depth $d_{ij}$ is computed and substituted into equation (1), and the linear system may be solved with the outlier-free tracks, obtained by merging three-view consistent observations (block 144).

Returning to two-view reconstruction (block 140), a pair-wise reconstruction for a translating pair of cameras (a, b) is denoted as $R^{ab} = \{C_b^a, C_b^a, \{X_j^{ab}\}\}$ where the superscript ab denotes a local coordinate system. Under pure translation, it is known that the epipoles in the two images coincide, and the points in the two views $x_{aj}$ and $x_{bj}$ are collinear with the common epipole e, also the focus of expansion (FOE). The epipole e is a vector that points along the baseline for the translating camera pair. The epipole e is computed by finding the smallest eigenvector of a 3×3 matrix produced by the outer product of a matrix of all 2D lines $l = x_{aj} \times x_{bj}$, and then choosing the first camera center at the origin and the second camera center at e, corresponding to a unit baseline. The 3D points are then triangulated using a linear method.

$$x_{kj} \times (X_j^{ab} - C_k^{ab}) = 0, \text{ for } k \in \{a, b\} \quad (2)$$

In one implementation, the points reconstructed behind both cameras and the ones with a small triangulation angle (e.g., less than one degree) are removed.

Figure 2:
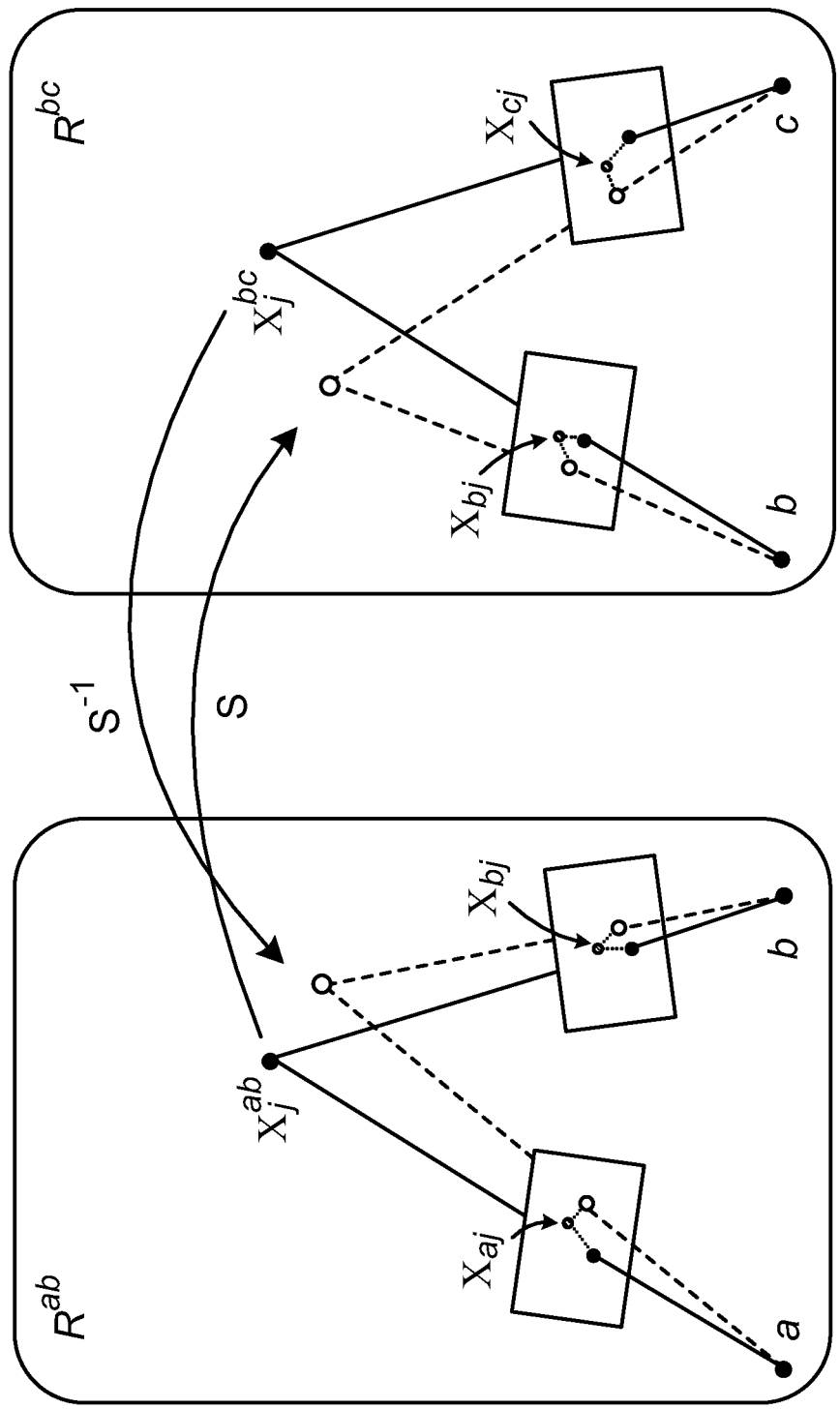
FIG. 2 is a representation of symmetric transfer error of a 3D similarity scale and translation transformation between two partial two-view reconstructions that share a camera and some common 3D points

With respect to robust alignment (block 142), each pair-wise reconstruction $R^{ab}$ involving cameras (a, b) differs from a global reconstruction by four degrees of freedom, namely an unknown scale $s^{ab}$ and translation tab, unique up to an arbitrary global scale and translation. Consider that $R^{bc}$ and $R^{ab}$ share camera b, and some common 3D points. Using MLESAC (P. H. S. Torr and A. Zisserman, *MLESAC: "A New Robust Estimator with Application to Estimating Image Geometry,"* CVIU, 78(1):138-156, April 2000), $R^{ab}$ is robustly aligned to $R^{bc}$ by computing a 3D similarity transformation $s_{bc}^{ab}$ (parameterized by relative scale $s_{bc}^{ab}$ and translation $t_{bc}^{ab}$). This transformation has four degrees of freedom. Random sampling is used to choose two common points, or one point when the common camera center is chosen. Assuming exact correspondence for the first point in $R^{cb}$ and $R^{ab}$ gives a translation hypothesis t. A scale hypothesis s is chosen by minimizing the image distance between the observed and reprojected points for the second 3D point. This can be computed in closed form as the reprojected point traces out a 2D line in the image as the scale changes. The hypothesis (s,t) is then scored using the total symmetric transfer error for the points in the four images. As represented in FIG. 2, for each $X_j$ this is equal to:

$$\sum_k d(x_{kj}, f_k^{ab}(S^{-1}X_j^{bc})) + \sum_k d(x_{kj}, f_k^{bc}(SX_j^{ab})) \quad (3)$$

where functions $f_k^{ab}$ and $f_k^{bc}$ compute the projection of a 3D point in each camera k of $R^{ab}$ and $R^{bc}$ respectively, and d robustly measures the distance between imaged points. FIG. 2 shows that the symmetric transfer error of the 3D similarity (scale and translation) transformation S from $R^{ab}$ to $R^{bc}$ is the sum of the distances between the observed points $x_{aj}$, $x_{bj}$, $x_{cj}$ and the projected points (shown as hollow dots).

Turning to global scale and translation estimation, once a sufficient number of pairwise transformations ($s_{jk}^{ij}$, $t_{jk}^{ij}$) between reconstructions $R^{ij}$ and $R^{jk}$ are known, the absolute scale and translations of these reconstructions, denoted by ($s^{ij}$, $t^{ij}$) and ($s^{jk}$, $t^{jk}$), can be estimated using the relation:

$$s^{jk}X+t^{jk}=s_{ij}^{jk}(s^{ij}X+t^{ij})+t_{ij}^{jk}, \quad (4)$$

where X is an arbitrary 3D point in global coordinates. Eliminating X gives four equations in eight unknowns:

$$w_{ij}^{jk}(s^{jk}-s_{ij}^{jk}s^{ij})=0 \quad (5)$$

$$w_{ij}^{jk}(s^{jk}t^{jk})=w_{ij}^{jk}(s_{ij}^{jk}t^{ij}+t_{ij}^{jk}). \quad (6)$$

Here, the weight $w_{ij}^{jk}$ is set to the number of three-view consistent points shared by the two reconstructions. The scale of any one reconstruction is set to unity and its translation set to zero to remove the global scale and translational ambiguity.

The actual linear system that is solved depends on the edge connectivity in an image-pair graph $G_r$. Any spanning tree will produce a linear system with an exact solution, but an advantageous choice is to use a maximum spanning tree computed by using the weights $w_{ij}^{jk}$ as edge weights. In practice, solving an over-determined linear system using additional edges is more reliable. We described a method to compute a suitable subgraph of the image-pair graph that covers all the cameras.

Even when the match graph $G_m$ is fully connected, $G_r$ may have multiple connected components. This can happen if a particular pairwise reconstruction did not share any 3D points in common with any other pair. However, what is needed is a connected sub-graph of $G_r$ that covers the cameras, which is denoted as G', and computed as follows:

- For each camera, create a list of reconstructions of which it is a part.
- Sort the pairwise reconstructions in increasing order of some measure of accuracy (e.g., by using the number of reconstructed points with less than 0.6 pixel residual error).
- Iterate through the sorted list of reconstructions, labeling the ones that contain fewer than τ accurately reconstructed points (e.g., τ=20 by default), provided it is not the only reconstruction of which a particular camera is part.
- Remove the nodes corresponding to labeled reconstructions from $G_r$, and the edges incident on these nodes. The maximum spanning tree of the largest connected component of $G_r$, denoted by G', is then computed.
- Sort the remaining edges in $G_r$ in decreasing order of weights, and iterate through them, adding an edge to G', as long as the maximum vertex degree in G' does not exceed k' (e.g., k'=10 by default).

With n cameras, the pruned match graph $G_m$ with maximum vertex degree k has at most O(kn) edges, whereby $G_r$ has O(kn) nodes as well. Every node in $G_m$ with degree d gives rise to $$\binom{d}{2}$$

edges in $G_r$. Therefore, $G_r$ has $O(nk^2)$ edges, and the number of pairwise reconstructions as well as the number of pairwise alignment problems are linear in the number of cameras. Moreover, each of the pairwise reconstructions and subsequent alignment problems can be solved in parallel.

By solving the over-determined linear system (equation (6)) corresponding to G', initial estimates are computed for all cameras and points by taking weighted averages of the aligned pairwise reconstructions. Using these estimates to compute depth $d_{ij}$, the linearized system (equation (1)) is solved to refine estimates for the cameras and points.

Exemplary Operating Environment

Figure 3:
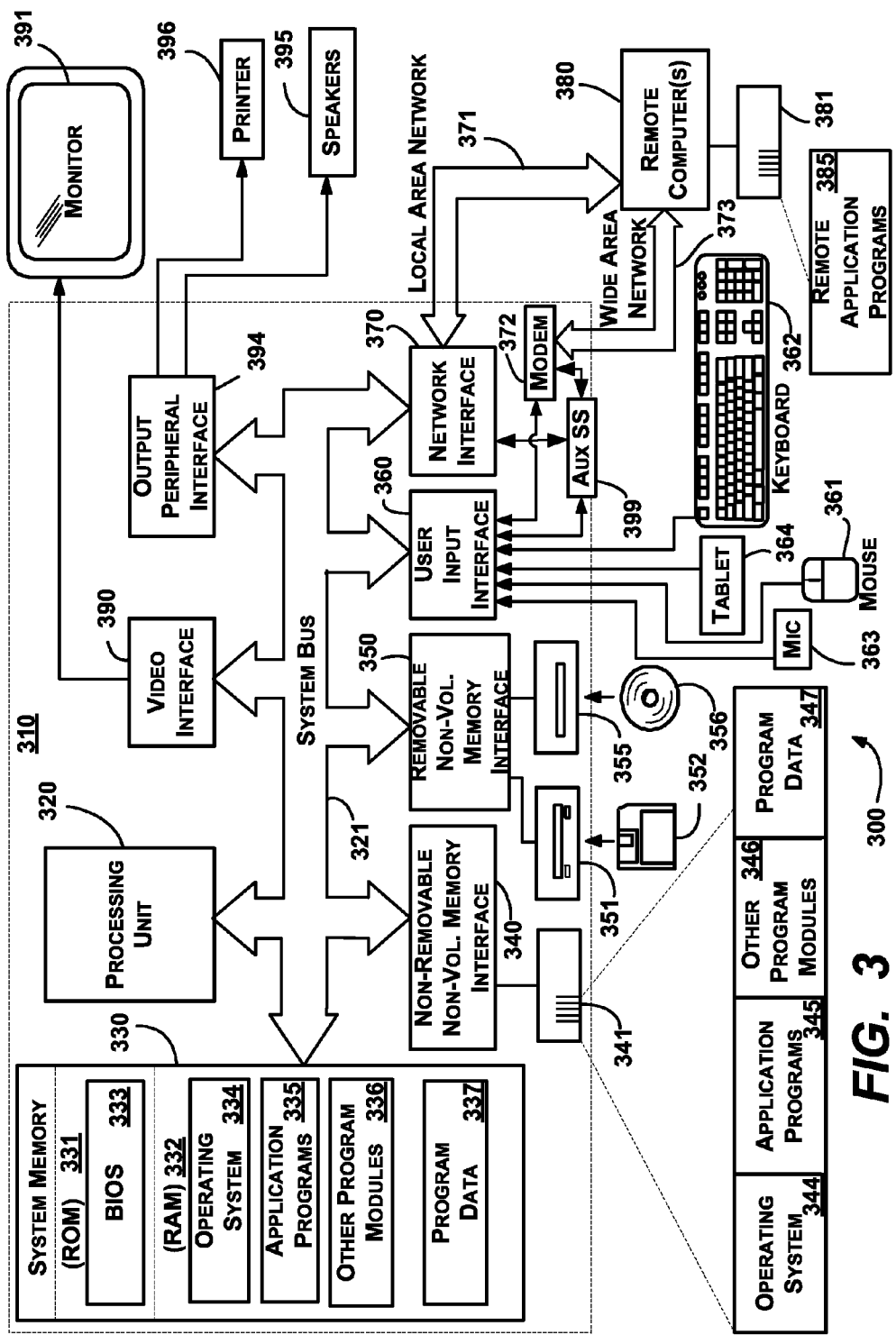
FIG. 3 shows an illustrative example of a computing environment into which various aspects of the present invention may be incorporated.

FIG. 3 illustrates an example of a suitable computing and networking environment 300 on which the examples of FIGS. 1 and 2 may be implemented. The computing system environment 300 is only one example of a suitable computing environment and is not intended to suggest any limitation as to the scope of use or functionality of the invention. Neither should the computing environment 300 be interpreted as having any dependency or requirement relating to any one or combination of components illustrated in the exemplary operating environment 300.

The invention is operational with numerous other general purpose or special purpose computing system environments or configurations. Examples of well-known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 3, an exemplary system for implementing various aspects of the invention may include a general purpose computing device in the form of a computer 310. Components of the computer 310 may include, but are not limited to, a processing unit 320, a system memory 330, and a system bus 321 that couples various system components including the system memory to the processing unit 320. The system bus 321 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 310 typically includes a variety of computer-readable media. Computer-readable media can be any available media that can be accessed by the computer 310 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 310. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during start-up, is typically stored in ROM 331. RAM 332 typically contains data and/or program modules that are immediately accessible to and/or presently being operated on by processing unit 320. By way of example, and not limitation, FIG. 3 illustrates operating system 334, application programs 335, other program modules 336 and program data 337.

The computer 310 may also include other removable/non-removable, volatile/nonvolatile computer storage media. By way of example only, FIG. 3 illustrates a hard disk drive 341 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 is typically connected to the system bus 321 through a non-removable memory interface such as interface 340, and magnetic disk drive 351 and optical disk drive 355 are typically connected to the system bus 321 by a removable memory interface, such as interface 350.

The drives and their associated computer storage media, described above and illustrated in FIG. 3, provide storage of computer-readable instructions, data structures, program modules and other data for the computer 310. In FIG. 3, for example, hard disk drive 341 is illustrated as storing operating system 344, application programs 345, other program modules 346 and program data 347. Note that these components can either be the same as or different from operating system 334, application programs 335, other program modules 336, and program data 337. Operating system 344, application programs 345, other program modules 346, and program data 347 are given different numbers herein to illustrate that, at a minimum, they are different copies. A user may enter commands and information into the computer 310 through input devices such as a tablet, or electronic digitizer, 364, a microphone 363, a keyboard 362 and pointing device 361, commonly referred to as mouse, trackball or touch pad. Other input devices not shown in FIG. 3 may include a joystick, game pad, satellite dish, scanner, or the like. These and other input devices are often connected to the processing unit 320 through a user input interface 360 that is coupled to the system bus, but may be connected by other interface and bus structures, such as a parallel port, game port or a universal serial bus (USB). A monitor 391 or other type of display device is also connected to the system bus 321 via an interface, such as a video interface 390. The monitor 391 may also be integrated with a touch-screen panel or the like. Note that the monitor and/or touch screen panel can be physically coupled to a housing in which the computing device 310 is incorporated, such as in a tablet-type personal computer. In addition, computers such as the computing device 310 may also include other peripheral output devices such as speakers 395 and printer 396, which may be connected through an output peripheral interface 394 or the like.

The computer 310 may operate in a networked environment using logical connections to one or more remote computers, such as a remote computer 380. The remote computer 380 may be a personal computer, a server, a router, a network PC, a peer device or other common network node, and typically includes many or all of the elements described above relative to the computer 310, although only a memory storage device 381 has been illustrated in FIG. 3. The logical connections depicted in FIG. 3 include one or more local area networks (LAN) 371 and one or more wide area networks (WAN) 373, but may also include other networks. Such networking environments are commonplace in offices, enterprise-wide computer networks, intranets and the Internet.

When used in a LAN networking environment, the computer 310 is connected to the LAN 371 through a network interface or adapter 370. When used in a WAN networking environment, the computer 310 typically includes a modem 372 or other means for establishing communications over the WAN 373, such as the Internet. The modem 372, which may be internal or external, may be connected to the system bus 321 via the user input interface 360 or other appropriate mechanism. A wireless networking component such as comprising an interface and antenna may be coupled through a suitable device such as an access point or peer computer to a WAN or LAN. In a networked environment, program modules depicted relative to the computer 310, or portions thereof, may be stored in the remote memory storage device. By way of example, and not limitation, FIG. 3 illustrates remote application programs 385 as residing on memory device 381. It may be appreciated that the network connections shown are exemplary and other means of establishing a communications link between the computers may be used.

An auxiliary subsystem 399 (e.g., for auxiliary display of content) may be connected via the user interface 360 to allow data such as program content, system status and event notifications to be provided to the user, even if the main portions of the computer system are in a low power state. The auxiliary subsystem 399 may be connected to the modem 372 and/or network interface 370 to allow communication between these systems while the main processing unit 320 is in a low power state.

Conclusion

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method performed on at least one processor comprising:
    obtaining camera rotation data for a plurality of cameras corresponding to a plurality of scene images;
    selecting pairs of cameras based upon observed two-dimensional point correspondences in the scene images;
    determining for each pair of images where a reliable estimate of the epipolar geometry is available, the translation direction and coordinates of three-dimensional points observed in the corresponding images;
    selecting pairs of pairs;
    determining, for each of the pairs of the pairs, a relative geometric transformation that brings the pairs of pairs into a common coordinate system to provide common three-dimensional points and outliers, wherein determining the relative geometric transformation comprises using known rotation data to parameterize the transformation by scale and a translation vector;
    removing the outliers; and
    processing data corresponding to the common three-dimensional points in a linear system to determine data corresponding to linear structure from motion parameters.

2. The method of claim 1 wherein obtaining the camera rotation data comprises extracting feature points and line segments from the images, pairwise matching the feature points, and estimating vanishing points from the line segments.

3. The method of claim 2 wherein obtaining the camera rotation data further comprises using relative rotation estimates obtained from point matches.

4. The method of claim 2 further comprising, computing global camera rotation data from the vanishing points.

5. The method of claim 4 wherein computing the global rotation data comprising rotationally aligning a plurality of cameras.

6. The method of claim 1 further comprising, performing an optimization on the linear structure from motion parameters to provide output data corresponding to final linear structure from motion parameters.

7. The method of claim 1 wherein determining, for each pair of cameras, the translation data comprises processing at least two pairs at least in part in parallel.

8. The method of claim 1 wherein determining, for each pair of pairs of cameras, the transformation data comprises processing at least two pairs of pairs at least in part in parallel.

9. In a computing environment, a system comprising:
    a feature extraction mechanism that extracts interest points and line segments from a plurality of images of a scene;
    a pairwise matching mechanism that computes pairwise relations between cameras based upon the interest points;
    a vanishing point estimation mechanism that estimates vanishing points from the line segments;
    a line segment and vanishing point matching mechanism that processes the pairwise relations and the vanishing points to compute point and line track data and vanishing point track data;
    a global camera rotation estimation mechanism that processes point and line correspondence data and vanishing point estimates in the images to obtain global camera rotation data; and
    a multi-stage linear reconstruction mechanism that uses known camera rotation data to compute camera translation data and 30 point data with outliers removed, to provide an initial estimate of all structure from motion parameters, which is able to be further refined using a bundle adjustment step, wherein at least one of the above mechanisms is implemented at least in part by at least one processor.

10. The system of claim 9 wherein the line segment and vanishing point matching mechanism computes multiple vanishing point match hypotheses for a rotation, and verifies the vanishing point match hypotheses by matching line segments.

11. The system of claim 9 wherein the scene comprises a man-made scene.

12. The system of claim 9 further comprising a bundle adjustment process that processes the initial estimation of the structure from motion parameters into optimized parameters.

13. The system of claim 9 wherein the linear reconstruction mechanism selects sets of cameras based upon shared two-dimensional point correspondence data, and for each set of cameras determines translation data and three-dimensional coordinates of the points by triangulation based upon the camera rotation data, selects pairs of sets based upon the translation data, and for each of the pairs of sets determines a relative geometric transformation that brings the pairs of sets into a common coordinate system to determine and remove the outliers and provide common three-dimensional points based on the approximate point depths.

14. The system of claim 13 wherein the sets of cameras each comprises a pair of cameras.

15. One or more computer storage devices having computer-executable instructions, which when executed, perform steps, comprising:
    obtaining camera rotation data for a plurality of cameras corresponding to a plurality of scene images;
    selecting pairs of cameras based upon observed two-dimensional point correspondences in the scene images;
    determining for each pair of images where a reliable estimate of the epipolar geometry is available, the translation direction and coordinates of three-dimensional points observed in the corresponding images;
    selecting pairs of pairs;
    determining, for each of the pairs of the pairs, a relative geometric transformation that brings the pairs of pairs into a common coordinate system to provide common three-dimensional points and outliers, wherein determining the relative geometric transformation comprises using known rotation data to parameterize the transformation by scale and a translation vector;
    removing the outliers; and processing data corresponding to the common three-dimensional points in a linear system and determining data corresponding to linear structure from motion parameters.

16. The one or more computer storage devices of claim 15, wherein obtaining the camera rotation data comprises extracting feature points and line segments from the images, pairwise matching the feature points, and estimating vanishing points from the line segments.

17. The one or more computer storage devices of claim 16, wherein obtaining the camera rotation data further comprises using relative rotation estimates obtained from point matches.

18. The one or more computer storage devices of claim 16 further comprising, computing global camera rotation data from the vanishing points, wherein computing the global rotation data comprises rotationally aligning a plurality of cameras.

19. The one or more computer storage devices of claim 15, further comprising, performing an optimization on the linear structure from motion parameters to provide output data corresponding to final linear structure from motion parameters.

20. The one or more computer storage devices of claim 15 wherein determining, for each pair of cameras, the translation data comprises processing at least two pairs at least in part in parallel.

* * * * *